March 3, 1959   G. R. FORRER ET AL   2,876,363
RADIATION PROJECTOR AND CHARGE HANDLING MEANS THEREFOR
Filed April 13, 1954                5 Sheets-Sheet 1

INVENTORS
Gilbert R. Forrer
BY John F. Klein
ATTORNEY.

March 3, 1959     G. R. FORRER ET AL     2,876,363
RADIATION PROJECTOR AND CHARGE HANDLING MEANS THEREFOR
Filed April 13, 1954                           5 Sheets-Sheet 4
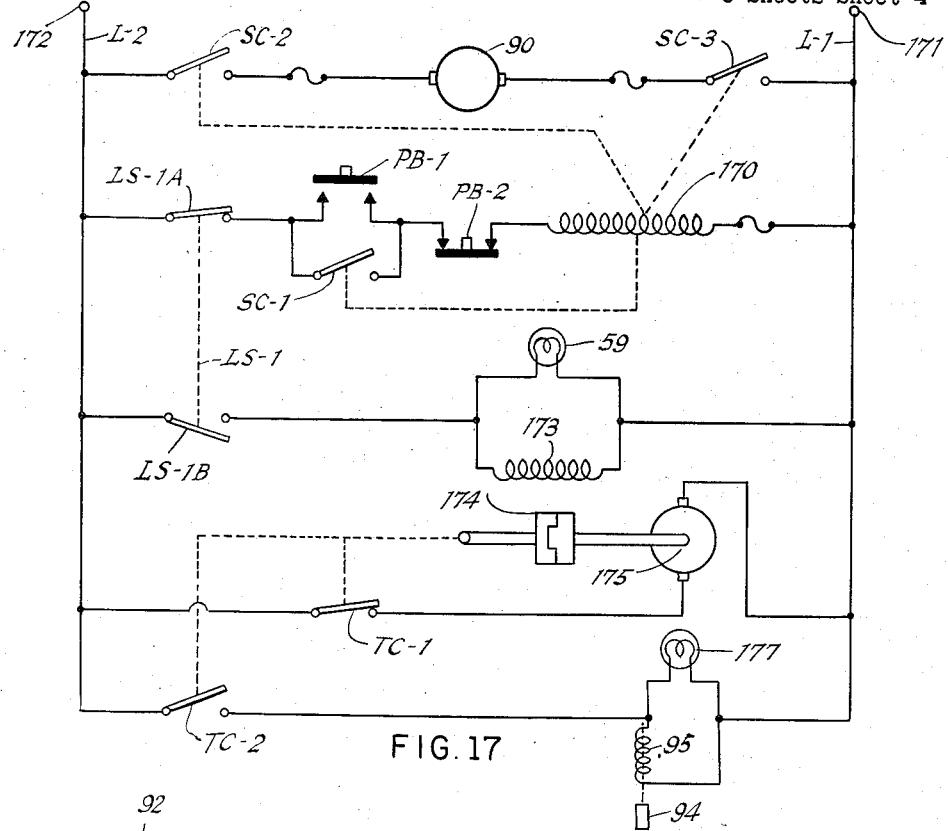
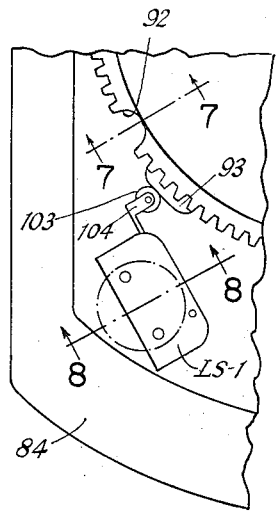
FIG. 6
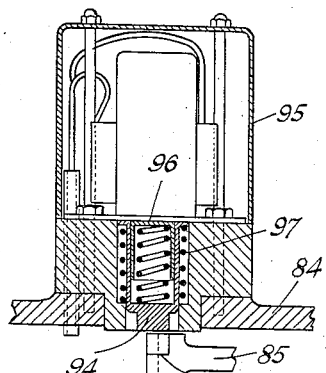
FIG. 7
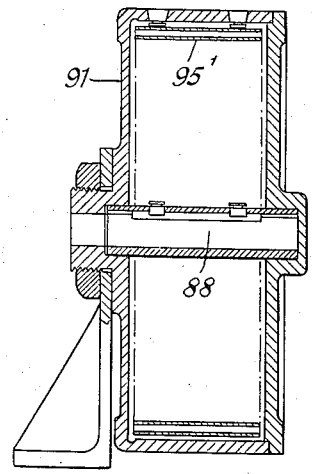
FIG. 9
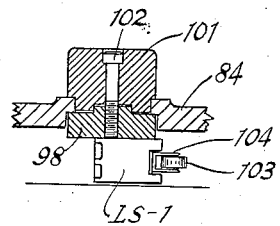
FIG. 8
INVENTORS
Gilbert R. Forrer
BY John F. Klein
ATTORNEY

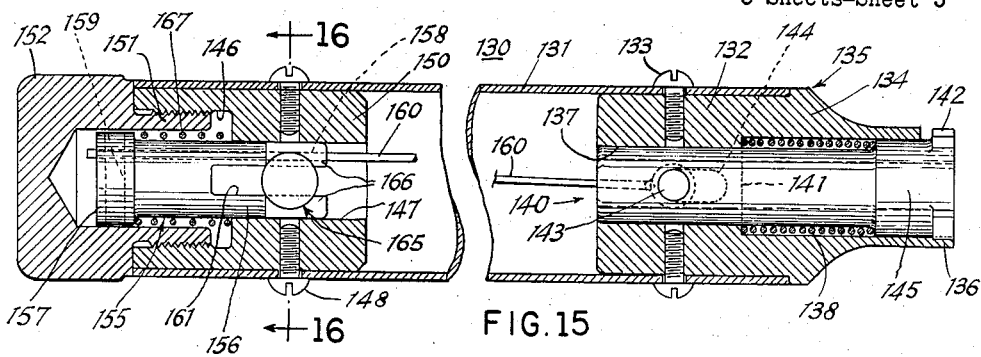
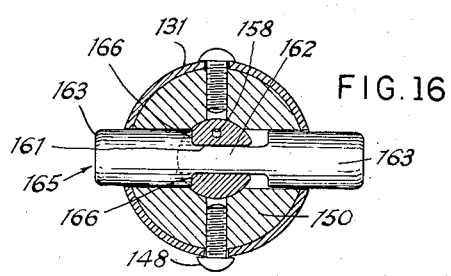
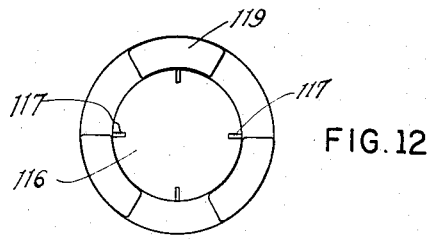
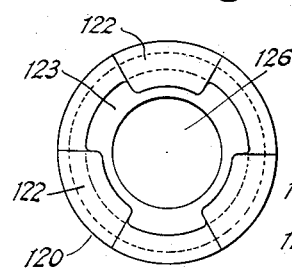
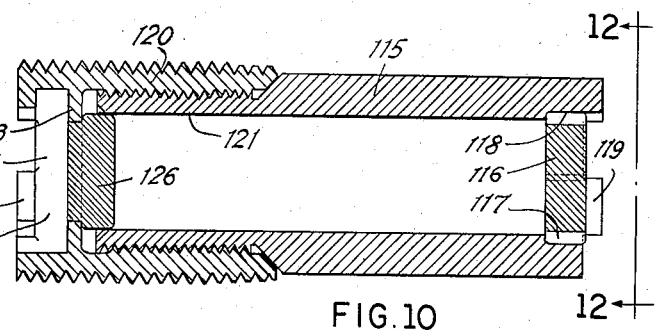
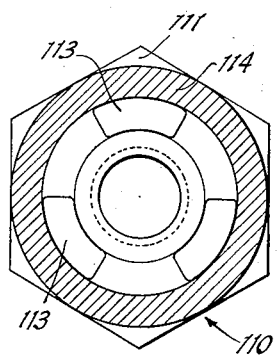
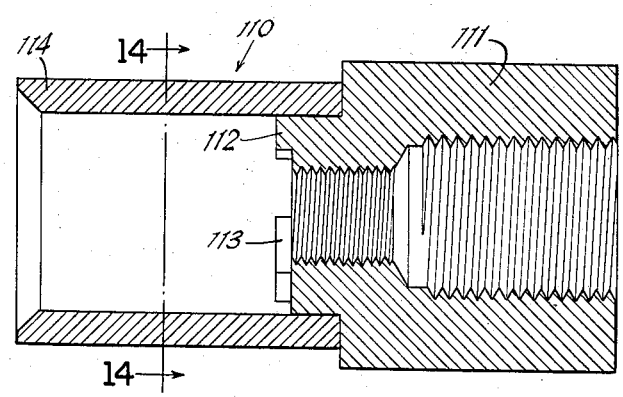

United States Patent Office 2,876,363
Patented Mar. 3, 1959

2,876,363

RADIATION PROJECTOR AND CHARGE HANDLING MEANS THEREFOR

Gilbert R. Forrer, Barberton, and John F. Klein, Akron, Ohio, assignors to The Babcock & Wilcox Company, New York, N. Y., a corporation of New Jersey Application April 13, 1954, Serial No. 422,746

10 Claims. (Cl. 250—106)

This invention relates to radiation projectors for the radiographic examination of bodies and, more particularly, to an improved and simplified "fail safe" radiation projector incorporating novel handling means for preparing and positioning the radiation source or charge.

Radiographic examinations of structures, such as of metal shells, weldments, castings, etc., are performed for the purpose of determining the soundness of the structure, any internal defects appearing as characteristic representations on a film or screen. Until recently, the source of radiation for such examinations has largely been confined to X-ray generators, particularly where structures of relatively great thicknesses must be examined. The X-ray generating equipment and necessary controls for effective penetration of thick bodies has been expensive and bulky, generally not being readily transportable.

While other radiation sources, such as radium, have found limited use for light work, they have not been practically adaptable for heavy work such as the radiographic examination of thick-walled pressure vessels, heavy castings, and the like. The more recent availability of radioactive isotopes has provided a radiation source whose penetrating power, under proper conditions, may approach that of the larger X-ray generators, and at a greatly reduced cost of installation and operation.

However, one of the chief problems in radiographic examination is the protection of operating personnel from the effects of powerful radiation. Such protection may be afforded by shielding or by keeping personnel a safe distance from the radiation source. Installations of X-ray generators usually include elaborate controls for sealing off the examination room while the generator is functioning, operations being carried out by remote controls and remote signalling arrangements. These controls add substantially to the cost of installing and operating the equipment.

Radiation projectors utilizing concentrated sources of radioactive material, such as radioactive isotopes, do not require the expensive, bulky, and complicated generating and control equipment necessary with X-ray installations. Thus, they can be simpler, more compact and readily portable. However, problems are encountered in providing for proper shielding of the source during operation and when idle, and in loading the radioactive source into the projector in initial "charging" or subsequent "recharging" of the projector.

The radioactive source, when the projector is not in use, must be completely shielded to prevent exposure of personnel to radiation. When the projector is to be utilized for radiographic examination, means must be provided for selectively positioning the source to direct the radiation only onto the object or material to be examined, and to confine the radiation only to the point of examination. Desirably, the positioning means for exposing the source should be remotely controlled, as should also be the means for positioning the source in the fully shielded position.

It has been proposed to provide a radiation projector, for use with radioactive isotopes, including a shielding housing means having a chamber therein receiving a movable shielding element within which is a radioactive source. This element is movable to a non-shielding position, for radiographic examination, by means triggered by an explosive charge detonated by remote control. After exposure, the element is manually returned to a shielded position.

This arrangement is subject to several disadvantages. In the first place, a new explosive charge must be provided and positioned for each operation. In the second place, manual operation to the non-shielded position is very undesirable due to the hazards to personnel involved.

The present invention is directed to a radiation projector in which a radiation source is disposed within a shielding element mounted in a chamber in a shielding and housing mass, and in which the shielding element is always biased to the shielding position. The shielding element is moved to the non-shielding position by remotely controlled power drive means operating counter to the biasing means. When the element reaches the non-shielding position, it is automatically latched thereat by a power operated latch normally biased to the release position, and the power drive means is deenergized. To restore the element to the non-shielded position, the power supply to the latch means is interrupted, releasing the latch so that the biasing means automatically restores the element to the shielding position. Thus, the projector "fails safe" as, if the power supply is unexpectedly cut off, the shielding element is automatically restored to the shielding position. Also, the projector may be re-operated at any time without any necessity for manual handling, as would be required to replace an explosive triggering charge.

The projector of the invention is also provided with novel means for safely "charging" a radioactive source into the shielding element. In a preferred embodiment of the invention, the shielding element is in the form of a cylinder of lead, or other shielding material, operating in a cylindrical cavity formed in a generally cylindrical shielding and housing structure. The shielding element is formed with a short radial recess whose length is only a minor fraction of the radius of the element, and this recess, in the non-shielding position of the element, is radially aligned with an aperture extending through the shielding and housing structure, this aperture flaring outwardly. The radioactive source, which may be a plurality of cylindrical pellets of Cobalt 60, is enclosed in a generally cylindrical housing having a cap removably threaded on its outer open end. This cap has means, such as threads, cooperatively engageable with mating means in the recess so that the cartridge may be threaded into the recess.

A special handling device is provided for loading the cartridge and for mounting the loaded cartridge into the shielding element or rotor. This handling device takes the form of an elongated tubular element which may have a length in excess of twelve feet. The operating end of this element is formed with latch means interengageable with latch means on the cartridge cap to lock the handling device to the cartridge cap. The latching means on the handling device are operable from the remote or manipulating end of the device by suitable means extending through the handling device from one end to the other.

A loading holder is provided in the form of an open ended container having a "nut" base by means of which the loading holder may be secured to a stud or bolt on the shielding and housing structure in place of the usual nut. To load the cartridge, the latter, with the cap removed, is placed in the loading holder and a funnel is placed over the cartridge. The radioactive pellets are then dropped into the cartridge by suitable handling means which are usually available at sources of radioactive isotopes, such as nuclear material plants. The handling device is then latched to the cap, and the cap is screwed onto the open end of the cartridge, there being cooperating means on the closed end of the cartridge and on the loading holder preventing relative rotation of these parts. With the handling device still attached to the loaded cartridge, the cartridge is withdrawn from the funnel and loading holder and inserted through the projection passage or aperture into the recess in the shielding element, the handling device being used to screw the cap into the recess to lock the cartridge in position.

The operating means of the radiation projector comprises a coil spring secured between the mounting shaft of the shielding element or rotor and a fixed point on the shielding and housing structure. This spring continuously biases the shielding element to a position where the recess therein is diametrically opposite the opening in the shielding structure so that the loaded cartridge is shielded not only by the shielding mass of the shielding element but also by a shielding mass in the shielding and housing structure. A motor and gear drive is provided to rotate the shielding element to a position radially aligned with the recess and the radiation projection passage in opposition to the biasing spring. When the shielding element reaches the "non-shielding" position, a latch, which is normally biased to the non-latching position, is electrically energized to lock the gearing against rotation and the drive motor is de-energized. So long as energization of the latch is maintained, the shielding element is thus locked in the non-shielding position. To move the shielding element to the shielding position, the latch energizing circuit is opened, releasing the latch, whereupon the biasing spring restores the shielding element to the shielding position. Thus, should there be a power failure, the radiation projector "fails safe." For cartridge loading purposes, a manually operable arm is secured to the shaft of the shielding element to rotate the latter to the non-shielding position, and a threaded stud is operated into engagement with the gearing to manually lock the shielding element in this position. After loading of the cartridge, this stud is withdrawn and the manually operable handle is removed.

For an understanding of the invention principles, reference is made to the following description of a typical embodiment thereof as illustrated in the accompanying drawings.

In the drawings:

Fig. 3A is an exploded view of the handling device cartridge and loading funnel;

Fig. 6 is a partial plan view, corresponding to Fig. 4, with a cover plate removed;

Figs. 7 and 8 are sectional views on the correspondingly numbered lines of Fig. 6;

Fig. 9 is a sectional view on the line 9—9 of Fig. 4;

Fig. 10 is an axial sectional view through the cartridge and its cap;

Fig. 11 is a left end elevation view of the cap;

Fig. 12 is a right end elevation view of the cartridge, taken on the line 12—12 of Fig. 10;

Fig. 13 is an axial sectional view through the loading holder;

Fig. 14 is a diametric sectional view on the line 14—14 of Fig. 13;

Fig. 15 is a broken away axial sectional view of the handling device;

Fig. 16 is a diametric sectional view on the line 16—16 of Fig. 15; and

Fig. 17 is a schematic wiring diagram of the control arrangement for the projector.

Figure 1:
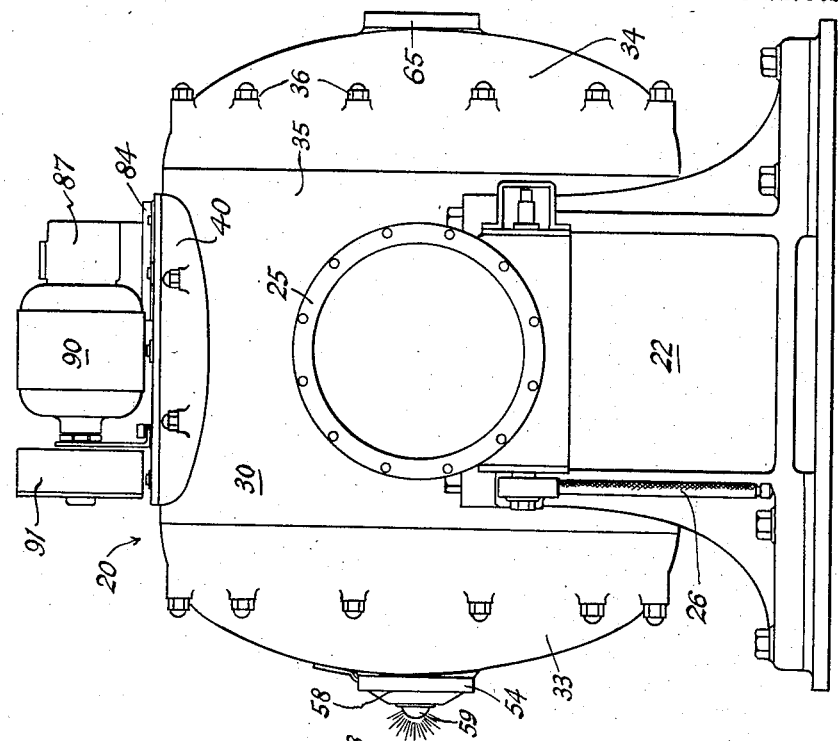
Fig. 1 is a side elevation view of a radiation projector embodying the invention.

Referring to Figs. 1 through 9 of the drawings, the radiation projector 20 of the invention includes a shielding and housing structure, generally indicated at 30, including a central, generally cylindrical barrel 35 having studs 32 projecting from each end in circumferentially spaced relation. These studs projected through correspondingly located apertured bosses on generally hemispherical end bells 33, 34, which are secured to barrel 35 by nuts 36 threaded onto studs 32. Barrel 35 is formed with diametrically oppositely extending trunnions 31 received in bearings 21 in pedestals 22 supporting projector 20 for adjustment about the axis of trunnions 31.

One trunnion 31 has keyed thereto an extension shaft 23 on which is secured a worm gear 24 in a housing 25 mounted on the corresponding pedestal 22. A worm, operable by a handle 26, is engaged with gear 24 to adjust projector 20 about trunnions 31.

Barrel 35 includes a generally cylindrical housing 37, of cast steel or the like, shaped at its ends to provide seats for end bells 33, 34. At the ends of a diameter perpendicular to the center line or axis of trunnions 31, housing 37 is formed with apertures, shaped as flat-sided ovals, receiving recessed, correspondingly shaped caps 40 secured to housing 37 by studs 38. Each cap 40 is formed with an inwardly facing bearing tube or recess 41 receiving a bearing 42 for the stub shafts 63 of shielding element or rotor 70.

Housing 37 is formed with a cylindrical passage or chamber 45 concentric with bearing recesses 41. This recess is defined by structural supports or ribs (not shown) integral with housing 37 and having inner ends integral with a circular guiding ring 43 having a convex web 44 extending into chamber 45 and peripheral flanges 46 whose inner surfaces are coincident with the surface of chamber 45. At one point on its periphery, ring 43 is formed with a radially outwardly extending enlargement 47 through which is formed an outwardly flaring, conical passage 50.

The interior of barrel 35, as defined by housing 37 and caps 40, is filled with shielding material except for the chamber 45, the shielding material in the housing proper being indicated at 51, with shielding material 52 filling the recesses 48 in the inner surfaces of caps 40 between bearing recesses 41 and rims 49. The shielding material is preferably lead which is cast into position.

Each end bell 33, 34 is formed with a threaded axial aperture 53 extending somewhat within the bell. The aperture 53 in end bell 33 receives a flanged threaded cup 54 filled with lead as at 56, the lead being recessed, as at 57, to receive the housing 58 for a pilot lamp 59 (Fig. 1). Aperture 53 in end bell 54 has the large end of a flanged metal cone 60 threaded into its inner end, the flange 61 of cone 60 seating against such inner end. The smaller end of cone 60 is formed with a rim 62 telescoping over a reduced extension on radial enlargement 47 of ring 43. A radiation diffusion cap 65 is threaded into and closes the outer end of the recess 53 in end bell 34. The interior of each end bell is filled with lead, as at 67, the filling having a cylindrical extension fitting a shallow cylindrical recess in the lead filling 51 of barrel 35.

Rotor 70 includes a supporting frame work including mating, generally frusto-conical halves 75, 75'. Each frame work half includes a hub 71, 71' connected by radiating spokes 72, 72' to a rim 73, 73'. Spokes 72' are formed with radial fins 74 extending substantially to the end and circumferential surfaces of one semicylindrical half of the rotor 70. Rim 73 fits within rim 73', and the two halves 75, 75' are secured together, as by bolts 76 extending through longitudinal apertures in the radial fins and threaded into bosses on rim 23. Hubs 71, 71' have stub shafts 68, 68' projecting therefrom.

The outer circumferential peripheries of rims 73, 73' are cooperatively formed to have guiding engagement with ring 43 of barrel 35. At one point, rim 73 is formed with a threaded radial aperture 77 aligned with a radial recess or pocket 80 in the cylindrical lead shielding mass supported by framework 75, 75'. It will be noted that recess 77 is somewhat larger in diameter than pocket 80, for a purpose to be described, and that pocket 80 extends only for a short distance toward the axis of rotor 70.

One stub shaft 68 extends through a stuffing box 78 in a cover plate 79 secured to the outer edge of the rim 49 of the associated cap 38, and through an apertured plate 81 secured over a central opening in plate 79. The outer end of this stub shaft is formed to disengageably receive a handle 82 used to manually position rotor 70 during charging of the projector, as will be described.

Figure 2:
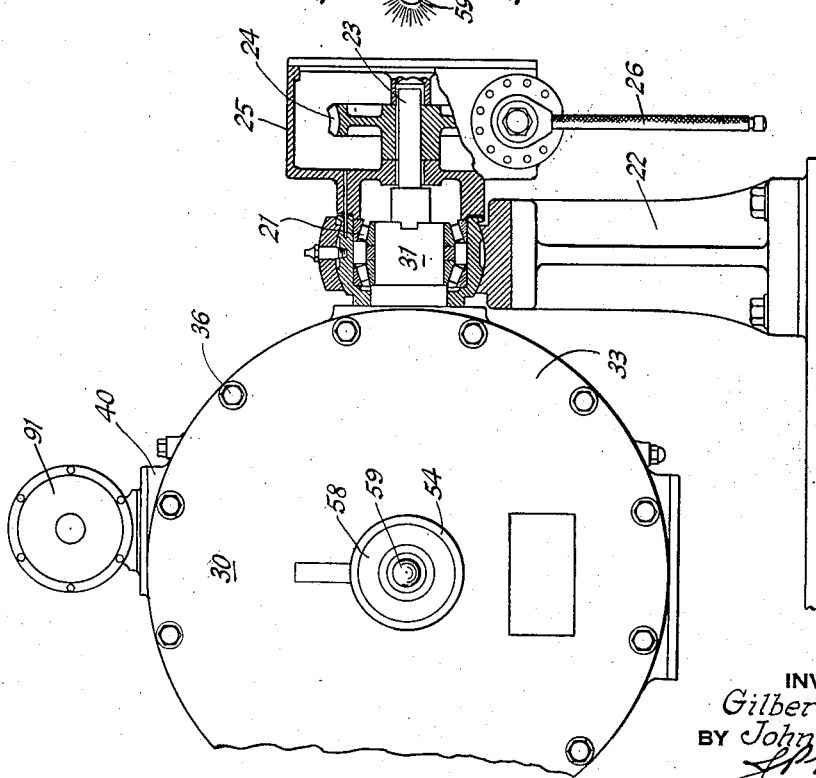
Fig. 2 is an end elevation view, partly in section, of the projector.

The opposite rotor stub shaft 68' is connected to the automatically controlled positioning means for rotor 70, shown in elevation in Figs. 1 and 2, and in greater detail in Figs. 3 and 4 through 9. Stub shaft 68' is keyed to a spur gear 85 mounted in an external recess 83 in the associated cap 37, this recess being closed, after projector 20 has been loaded, by a mounting and cover plate 84 secured to the rim 49 of cap 40. Gear 85 meshes with the drive pinion 86 of a gear reducer 87 mounted on plate 84 and connected to the output shaft of a gear motor 90 mounted on plate 84.

The shaft 88 of motor 90 extends into a spring housing 91, on plate 84, containing a coil spring 95' secured, at its inner end, to shaft 88 and, at its outer end, to housing 91. Spring 95' is wound when motor 90 is energized to move rotor 70 from the shielding to the non-shielding position, so that spring 95' is operative to automatically restore rotor 70 to the shielding position.

Referring to Figs. 6, 7 and 8, spur gear 85 has a notch 92 in its periphery, adjacent which a cam bar 93 is secured to the gear periphery. Notch 92 is so located that, when pocket 80 is aligned with cone 50, notch 92 will be aligned with a pin member 94 telescoped over the plunger 96 of a solenoid 95 mounted on plate 84. A spring 97 biases pin member 94 to the retracted position, the pin member being advanced into notch 92 only when solenoid 95 is energized to project its plunger 96.

Cam bar 93 is arranged to operate a limit switch LS–1 just as notch 92 becomes aligned with pin member 94. Limit switch LS–1 is mounted on a circular plate 98 sitting in a circular recess in the inner surface of plate 84 and secured to a positioning knob 101 by a stud 102. Knob 101 may be turned to position the roller 103 on the operating arm 104 of switch LS–1 either in the path of bar 93 or out of the path of the latter. This allows the automatic drive control to be rendered inoperative when necessary or desirable. The operation of the rotor positioning mechanism will be described more fully hereinafter.

Before projector 20 can be utilized for radiographic examinations, it must be loaded or charged with a radioactive source. For this loading, the projector is preferably shipped to a location where radioactive isotopes are available. Referring to Figs. 3, 3A and 10 through 16, before projector 20 is shipped for loading, cover plate 84 and the elements mounted thereon are removed and replaced by a cover plate 100. The latter has an aperture to receive the outer hub of pinion 86 and a threaded aperture receiving a flat ended set screw 105 provided with a lock-nut 106. Set screw 105 is threaded into firm engagement with gear 85, with rotor 70 preferably in the non-shielding position, and lock nut 106 is tightened against a washer 107.

Before shipment, one of the nuts 36 on a stud 32 is removed, and a loading holder 110 is secured to this stud. Holder 110 comprises a nut 111 having a reduced shoulder 112, on its outer end, formed with clutch teeth 113. A cylinder 114 is secured to shoulder 112 and extends coaxially therefrom.

The radioactive source or charge, which may be in the form of cylindrical pellets of radioactive "Cobalt 60," is contained in a cartridge comprising a cylindrical container or barrel 115 and a cap 120. Barrel 115 has one (inner) end closed by a circular plate 116 formed with radial slots 117 so that plate 116 may be press fitted into a recess 118 in the inner end of the barrel. This end is formed with clutch teeth 119 intermeshable with clutch teeth 113 of holder 110, the outer diameter of barrel 115 being just slightly less than the inner diameter of cylinder 114.

The outer end of barrel 115 is reduced and threaded, as at 121, to receive the internally and externally threaded cap 120. The outer diameter of cap 120 is somewhat greater than that of barrel 115 and corresponds to the diameter of threaded recess 77 in rim 73 of rotor 72. Thereby, the cartridge may be mounted in rotor 70 by threading cap 120 into recess 77 with barrel 115 in pocket 80.

Cap 120 is formed for releasable latching to a handling device 130. The outer end of the cap has radially inwardly projecting, circumferentially spaced lips 122 which are spaced from an inner annular flange 123 to form a recess 124. The opening in flange 123 is closed by a press fitted metal plug 126 having a tight fit into barrel 115 when the cap is secured to the barrel.

To load the projector 20, the projector is positioned so that loading holder 110 is upright, lock nut 106 is loosened, and set screw 105 is withdrawn from engagement with gear 85. Handle 82 is engaged with stub shaft 68 and rotor 70 turned to align pocket 80 with cone 60. The barrel 115 of the cartridge is then inserted into the cylinder 114 of holder 110, with cap 120 removed and teeth 119 meshed with teeth 113 to prevent rotation of barrel 115. A funnel 125 (Fig. 3A) is then slipped over barrel 115 and, by means available at the source of supply thereof, cylindrical pellets of "Cobalt 60" are placed into barrel 115.

Meanwhile, cap 120 has been latched to the operating or latching end of handling device 130 in a manner described more fully hereinafter. When the full charge of pellets has been placed into barrel 115, cap 120 is screwed tightly to the barrel by operating device 130. The cartridge is then withdrawn from holder 110 and, still latched to handling device 130, is inserted through cone 60 and aperture 50 into pocket 80. Device 130 is then used to screw cap 120 firmly into aperture 77, after which device 130 is unlatched or released from cap 120 and withdrawn. Handle 82 is then manipulated to rotate rotor 70 substantially 180°, and set screw 105 is turned to engage gear 85 to lock the rotor in the shielding position with the radioactive source completely surrounded by the lead shielding masses. Lock nut 106 is retightened, handle 82 is removed, and funnel 125 is taken from holder 110. Projector 20 is then shipped to the point of use.

Handling device 130 is a very important feature of the invention as it permits manipulation of the loaded cartridge without hazard to personnel. Referring to Figs. 3A, 15 and 16, device 130 includes a ribbed aluminum sleeve 131 substantially twelve feet (12') long. The latching or drive end of sleeve 131 has secured therein a drive stem 135 including a tubular hub 132, secured to sleeve 131 by screws 133, and a stem portion 134 projecting beyond the sleeve. The end of stem portion 134 is formed with circumferentially spaced teeth 136 interfitting between teeth 122 on cap 120. A central passage 137 in drive stem 135 slidably receives a tubular locking stem 140 having an enlarged head 145. A coil spring 138, embracing locking stem 140 and seating against head 145 and a shoulder 141 in passage 137 normally biases locking stem 140 outwardly relative to drive stem 135. The outer end of head 145 has circumferentially spaced radial teeth 142 arranged to fit between teeth 122 of head 120 into recess 124, and to engage beneath teeth 122 when device 130 is rotated. Outward movement of locking stem 140 is limited by a diametrically extending pin 143 on the locking stem engaged in slots 144 in the drive stem 135.

The manipulating end of sleeve 131 receives a bronze guide 150 having an enlarged and threaded central recess 146 in its outer end coaxial with a smaller diameter passage 147. Recess 146 receives the threaded tubular stem 151 of a cap 152 closing the recess. Guide 150 is secured to sleeve 131 by screws 148.

A cylindrical anchor 155 has a stem 156 extending into passage 147 and has an enlarged head 157 sliding in stem 151 of cap 152. A passage 158 extends longitudinally through anchor 155 and intersects a threaded cross passage 159 in head 157. Passage 159 receives a set screw which locks one end of a relatively stiff wire 160, extending through passage 158, to anchor 155. The opposite end of wire 160 extends into locking stem 140 and is secured to pin 143.

Stem 156 of anchor 155 has a parallel sided, axial slot 161 extending thereinto from its inner end. This slot receives the flattened central section 162 of a cylindrical locking pin 165. The cylindrical ends 163 extend through cylindrical cross passages 164 in guide 150 and outwardly through aligned apertures in sleeve 131. The length of section 162 of pin 165 is substantially equal to the diameter of stem 156 of anchor 155.

For a distance from its inner end, the outer surface of stem 156 is cut away, at right angles to the walls or sides of slot 161 and adjacent one lateral end of the slot, to form flattened surfaces 166. A spring 167 embraces stem 156, seating between head 157 and the base of recess 146. This spring, which is appreciably weaker than spring 138, biases anchor 155 outwardly when locking stem 140 is pushed into drive stem 135. Spring 167 biases anchor 155 inwardly sufficiently for pin 165 to be moved to the right (Fig. 16) to engage pin end 163 with flattened surfaces 166 so that end 163 engages the uncut portion of stem 156 to lock anchor 155 in the outer position holding locking stem 140 retracted into drive stem 135.

To latch device 130 to cap 120, pin 165 is moved to the left (Fig. 16), releasing anchor 155 for movement toward the latching end of device 130, as spring 138 forces locking stem 140 outwardly of drive-stem 135, due to the interconnecting wire 160. This position is shown in Fig. 3A. Teeth 142 are then inserted between the teeth 122 of cap 120 into recess 124. Device 130 is then rotated slightly to align teeth 142 beneath teeth 122, and to align teeth 136 with the spaces between teeth 122. Device 130 is then pushed toward cap 120 to engage teeth 136 with the end of the cap. This compresses spring 138 so that spring 167 moves anchor 155 toward cap 152 so that pin 165 may be restored to the locking position. Device 130 is now latched to cap 120, with the teeth 142 of locking stem 140 beneath the teeth 122 of cap 20, the teeth 136 of drive stem 135 between teeth 122, and the end of the drive stem, between teeth 136, engaging the outer surfaces of teeth 122.

Release of device 130 from cap 120 is effected by moving pin 165 to the left (Fig. 16) allowing locking stem 140 to move outwardly of drive stem 135 to the released position.

When the loaded projector 20 is at the point of use, set screw 105 is released, plate 100 is removed, and plate 84 with the drive attachments is secured in place. After connection to a source of electric power, projector 20 is ready for use.

Figure 3:
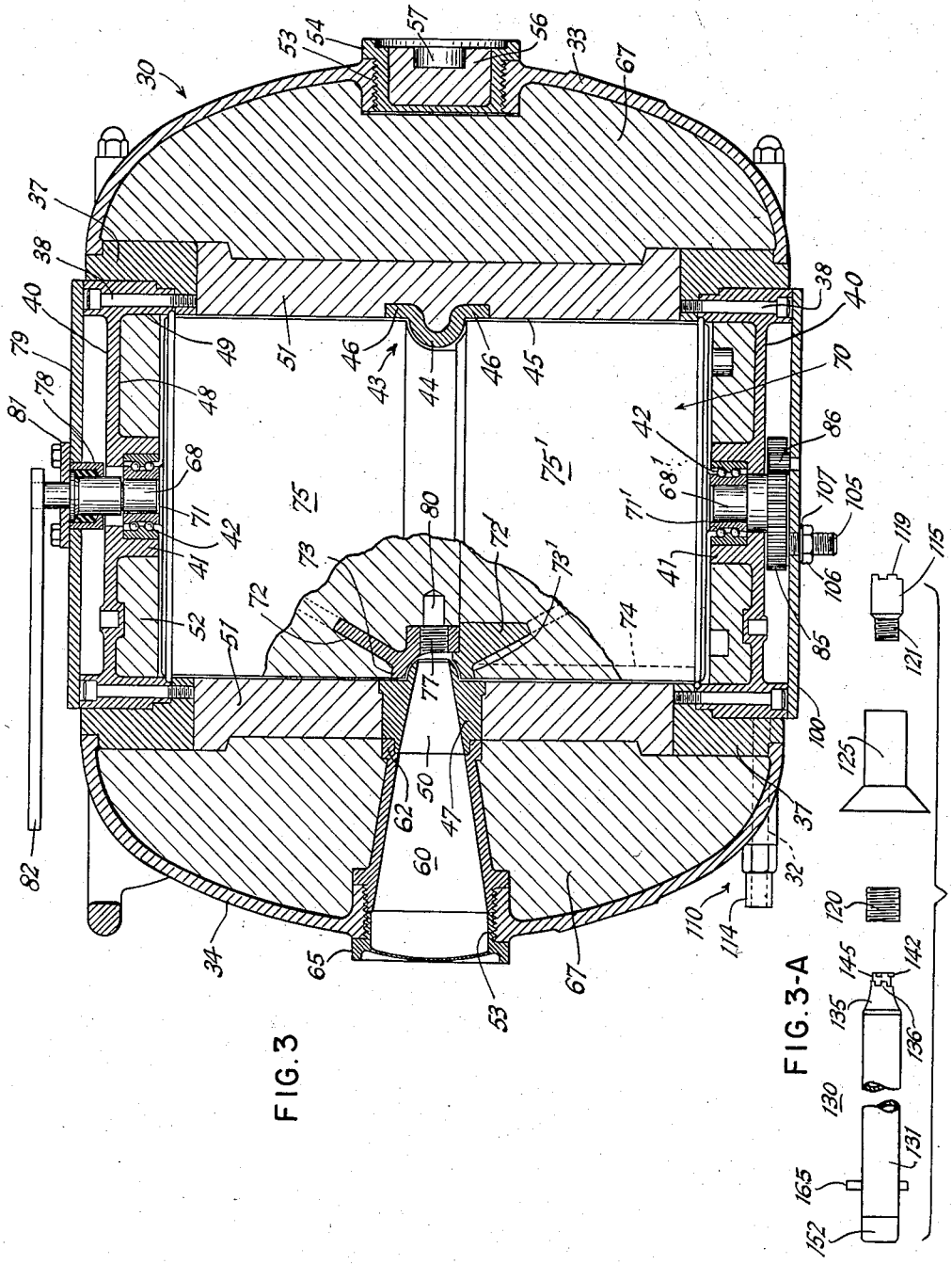
Fig. 3 is a central longitudinal sectional view through the projector.
Figure 4:
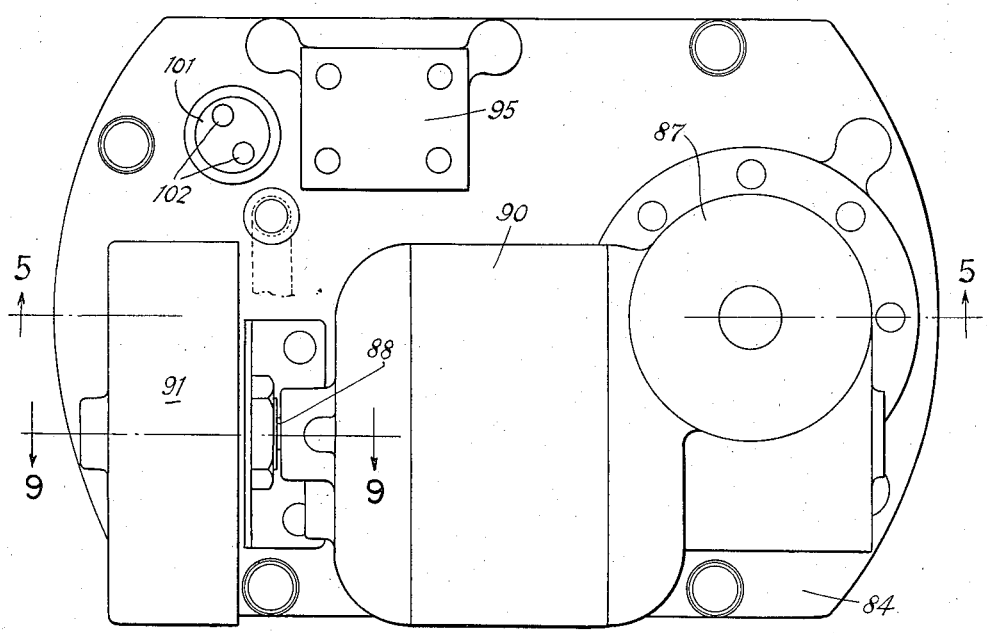
Fig. 4 is a partial top plan view of the projector showing the power operated mechanism.
Figure 5:
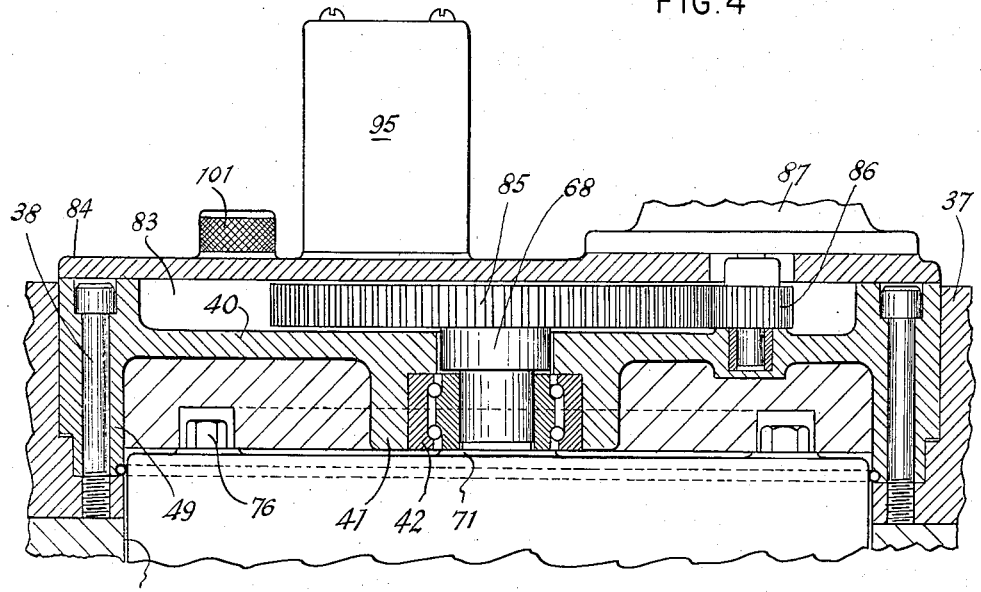
Fig. 5 is a sectional view on the line 5—5 of Fig. 4.

Before operation, rotor 70 is biased to the shielding position by spring 95', engagement of cam bar 93 with pinion 86 limiting the rotor movement to a position substantially 180° from that of Fig. 3. Worm gear 24 is operated by handle 26 to swing projector 20 about the axis of trunnions 31 to direct cone 60 toward the objective. Operation of rotor 70 to the non-shielded position for radiographically examining the objective will be understood from reference to the schematic wiring diagram of Fig. 17.

To move rotor 70 to the non-shielding position, "start" push button PB-1 is momentarily depressed. Motor starter 170 is connected across lines L-1 and L-2, connected to a source of potential at terminals 171, 172, through normally closed contacts LS-1A of limit switch LS-1, button PB-1, and "stop" push button PB-2. Starter 170 closes its contacts SC-1, SC-2, and SC-3. Contacts SC-1 shunt push button PB-1 to hold the starter circuit closed. Contacts SC-2 and SC-3 connect motor 90 across the line to rotate gear 85 to turn rotor 70 toward the non-shielding position exposing cartridge 115—120 through cone 60. Motor 90 winds spring 95'.

As rotor 70 reaches the non-shielding position, cam bar 93 operates switch LS-1 to open its contacts LS-1A and closes its contacts LS-1B. Opening of contacts LS-1A breaks the "hold" circuit for starter 170 which opens its contacts SC-1, SC-2 and SC-3, opening of the latter two deenergizing motors 90. Closing of contacts LS-1B completes the energizing circuit for the operating coil 173 for clutch 174 of timer 175 to engage this clutch. The clutch immediately closes timer contacts TC-1 to connect timer 175 across the line, the timer being pre-set for the desired exposure time. Closure of contacts LS-1B also energizes pilot lamp 59.

Timer contacts TC-2 are simultaneously closed to energize solenoid 95 and pilot lamp 177. Solenoid 95 projects its plunger 96 to engage pin 94 in notch 92 of gear 85, locking rotor 70 in the non-shielding position. Pilot lamp 177 is preferably mounted on or adjacent push button PB-1 to indicate start of the exposure time and warn the operator that the radioactive source is now exposed.

At the end of the pre-set exposure time, timer clutch 174 opens timer contacts TC-1 and TC-2 to deenergize timer 175 and solenoid 95'. Retraction of solenoid plunger 96 withdraws pin 94 from notch 92, and spring 95' spins rotor 70 back to the shielded position. As cam bar 93 releases roller 103 of switch LS-1, this switch opens its contacts LS-1B to deenergize operating coil 173 and extinguish pilot lamp 176. At the same time, switch LS-1 recloses its contacts LS-1A to restore the system for the next operation.

Thus, the projector 20 can be repeatedly conditioned to make an exposure and restored to the source shielding condition, without any necessity for manual manipulation for replacement of explosive charges or the like. The projector "fails safe," as power failure will deenergize solenoid 95 to withdraw pin 94 so that spring 95' will spin rotor 70 to the shielding position. It should be noted that the internal supporting structures of the rotor extend at an angle to the axis of pocket 80, so as not to be in the path of radiation from the source in cartridge 115—120, the rays travelling in a straight line.

While a specific embodiment of the invention has been shown and described in detail to illustrate the application of the invention principles, it will be understood that the invention may be embodied otherwise without departing from such principles.

What is claimed is:
1. A radiation projector comprising, in combination, a shielding and housing structure defining a chamber; a shielding element movably mounted within said chamber; a radiation source within said movable element;

power drive means operable, when energized, to move said element to a non-shielding position; power operated, normally released latch means operable, when energized, to latch said element in the non-shielding position; and spring means operatively connected to said element and wound by movement of said element to the non-shielding position; whereby, upon interruption of the power supply, said spring means will unwind to move said element to the shielding position.

2. A radiation projector comprising, in combination, a shielding and housing structure defining a chamber; a shielding element movably mounted within said chamber; a radiation source within said movable element; power drive means operable, when energized, to move said element in one direction to a non-shielding position; power operated, normally released latch means operable, when energized, to latch said element in the non-shielding position; control means selectively operable to energize said power drive means; control mechanism operable by said element, in the non-shielding position to energize said latch means and de-energize said power drive means; and means biasing said element in the opposite direction to a shielding position; whereby, upon interruption of the power supply, said element will be moved to the shielding position.

3. A radiation projector comprising, in combination, a shielding and housing structure defining a chamber; a shielding element movably mounted within said chamber; a radiation source within said movable element; power drive means operable to move said element in one direction to a non-shielding position; power operated, normally released latch means operable to latch said element in the non-shielding position; control means selectively operable to energize said power drive means; control mechanism operable by said element, in the non-shielding position to energize said latch means and de-energize said power drive means; timer means energized, responsive to movement of said element to the non-shielding position, to de-energize said latch means after a pre-settable interval; and means biasing said element in the opposite direction to a shielding position; whereby, at the end of said pre-settable time interval, said element is automatically returned to the shielding position.

4. A radiation projector comprising, in combination, a shielding and housing structure defining a chamber; a shielding element movably mounted within said chamber; a radiation source within said movable element; power drive means operable to move said element to a non-shielding position; power operated, normally released latch means operable to latch said element in the non-shielding position; control means selectively operable to energize said power drive means; control mechanism operable by said element, in the non-shielding position to energize said latch means and de-energize said power drive means; timer means energized, responsive to movement of said element to the non-shielding position, to de-energize said latch means after a pre-settable interval; and means biasing said element to a shielding position; whereby, at the end of said pre-settable time interval, said element is automatically returned to the shielding position.

5. A radiation projector comprising, in combination, a shielding and housing structure defining a chamber and formed with a radiation projecting passage interconnecting the chamber and the exterior of said structure; a shielding element movably mounted within said chamber for movement therein between shielding and non-shielding positions, and formed with a pocket alignable with said passage in the non-shielding position of said element and extending substantially normal to the direction of movement of said element; a cartridge arranged to contain a source of radiation and receivable in said pocket; interengageable means on said cartridge and in said pocket for releasably securing said cartridge in said pocket; a very substantially elongated handling device having a gripping end and a manipulating end; latch means on the outer end of said cartridge; latch mechanism on the gripping end of said handling device interengageable with said latch means to lock said cartridge to said handling device; and a manipulator for said latch mechanism operable from the manipulating end of said handling device; whereby the operating end of said handling device may be locked to said cartridge and said handling device utilized to insert said cartridge through said passage and secure said cartridge in said pocket, and said handling device may be released from said cartridge and withdrawn from said projector without the operator of the handling device being in dangerous proximity to a source of radiation in said cartridge.

6. A radiation projector as claimed in claim 5 in which said cartridge comprises a container having an open end and a cap securable to the open end of said container, said pocket and said cap being formed with mating threads.

7. A radiation projector as claimed in claim 5 in which said cartridge comprises a container having an open end of said container, said pocket and said cap being formed with mating threads, and said latch means being on the outer end of said cap.

8. A radiation projector as claimed in claim 5 in which said cartridge comprises a container having an open end and a cap threadable in the open end of said container, said pocket and said cap being formed with mating threads, and said latch means being on the outer end of said cap; said housing structure includes casing sections joined by nuts threaded on studs projecting from one casing section through an adjacent casing section; a cartridge loading holder including a tubular element for telescopically receiving said container and having one end closed by a nut element secured to said tubular element and threadable on one of said studs; and interengageable means on the closed end of said container and on the inner surface of said nut element to prevent rotation of said container when the latter is inserted into said loading holder; whereby, said container may be placed in said loading holder, said cap may be latched to said handling device, a radiation source may be loaded into said container, and said cap may be secured to said container without the operator of the handling device being in dangerous proximity to a source of radiation in said cartridge.

9. A radiation projector as claimed in claim 5 in which said shielding element includes a mass of shielding material supported and enclosing structural components; said structural components being out of alignment with and extending at an angle to said pocket.

10. A radiation projector as claimed in claim 5 including means mounting said projector for angular adjustment about an axis perpendicular to said passage.

References Cited in the file of this patent
UNITED STATES PATENTS

| 2,477,648 | Piggot et al. | Aug. 2, 1949 |
| 2,670,443 | Pennock et al. | Feb. 23, 1954 |